(12) United States Patent
Chen et al.

(10) Patent No.: US 7,661,704 B2
(45) Date of Patent: Feb. 16, 2010

(54) COMBINATION GRAB HANDLE AND AIRBAG BRACKET

(75) Inventors: Xiaoming Chen, Canton, MI (US); David A. Wagner, Northville, MI (US); Omar Faruque, Ann Arbor, MI (US); Thierry Guimberteau, Livonia, MI (US); Daniel J. Szalay, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 11/936,124

(22) Filed: Nov. 7, 2007

(65) Prior Publication Data

US 2009/0115169 A1    May 7, 2009

(51) Int. Cl.
*B60R 21/20* (2006.01)
*B60R 21/213* (2006.01)

(52) U.S. Cl. .................. 280/730.2; 280/728.2
(58) Field of Classification Search .......... 280/728.2, 280/730.2, 749; 296/214, 216.06; 248/222.14, 248/222.21; 24/289
See application file for complete search history.

(56) References Cited

U.S. PATENT DOCUMENTS

| | | | | |
|---|---|---|---|---|
| 6,089,595 A * | 7/2000 | Enders | ............ | 280/730.2 |
| 6,340,169 B1 * | 1/2002 | Tietze | ............ | 280/728.2 |
| 6,364,343 B1 | 4/2002 | Slota | ............ | 280/728.2 |
| 6,736,421 B2 | 5/2004 | Blake | ............ | 280/730.2 |
| 6,761,374 B2 * | 7/2004 | Di Sante et al. | ............ | 280/728.2 |
| 7,100,939 B2 | 9/2006 | Blake | ............ | 280/728.2 |
| 7,175,196 B2 * | 2/2007 | Boxey | ............ | 280/730.2 |
| 2001/0040361 A1 * | 11/2001 | Tajima et al. | ............ | 280/728.2 |
| 2002/0190507 A1 * | 12/2002 | Sante et al. | ............ | 280/730.2 |
| 2003/0205887 A1 * | 11/2003 | Wallner et al. | ............ | 280/730.2 |
| 2004/0108693 A1 * | 6/2004 | Foster et al. | ............ | 280/730.2 |
| 2004/0256843 A1 | 12/2004 | Totani | ............ | 280/730.2 |
| 2006/0267315 A1 * | 11/2006 | White, Jr. | ............ | 280/730.2 |
| 2007/0052220 A1 | 3/2007 | Hidaka | ............ | 280/730.2 |

* cited by examiner

*Primary Examiner*—Ruth Ilan
(74) *Attorney, Agent, or Firm*—Gregory Brown; Miller Law Group, PLLC

(57) ABSTRACT

A dual function mounting bracket is affixed to a hydroformed roof side rail to allow the connecting brackets to be located at the same position as previously known despite the use of a hydroformed roof side rail frame member that has a substantially different shape and configuration. The dual function mounting bracket has a first mounting surface projecting upwardly from a second mounting surface to provide support for a grab handle connecting bracket. The second mounting surface provides support for the connecting bracket of a side curtain air bag. The second mounting surface is also configured with a pair of side tabs and a front tab for welding the mounting bracket to a hydroformed roof side rail. The grab handle spans between the mounting bracket and a spaced apart sole function mounting bracket. A bead between the first and second mounting surfaces on the dual function mounting bracket provides stiffness.

18 Claims, 5 Drawing Sheets

COMBINATION GRAB HANDLE AND AIRBAG BRACKET

FIELD OF THE INVENTION

This invention relates generally to the mounting of a grab handle apparatus in an automotive vehicle and, more particularly, to a bracket that can be used with a hydroformed roof side rail to mount both the grab handle and the airbag attachment.

BACKGROUND OF THE INVENTION

Hydroformed tubular frame members are now being utilized in the production of automotive frames. The hydroforming process starts with a standard tubular stock member that is placed into a form or die shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members.

The closed section of a hydroformed frame member can increase the strength of the automotive frame. Thus, the use of hydroformed members is highly desirable in the production of the frame for the roof. The use of hydroformed members as the roof side rail, for example, can improve roof strength as compared to previously used spot-welded, stamped open frame sections, such as is depicted in FIGS. 1 and 2. The hydroformed roof side rails will have constant peripheries, which is a limitation to the change of the cross-section of the roof side rail in either size or geometry. The limited ability to change cross-section creates a challenge in the mounting of the grab handle and the curtain air bag as the hydroformed roof side rail does not provide the same mounting surfaces for attachment of the grab handle and the curtain air bag as does the stamped and welded conventional roof side rail structure.

The grab handle has become a standard feature of passenger vehicles, particularly in sport utility vehicles and pick-up trucks, while the curtain side air bag has become a popular option that is frequently selected in the purchase of an automobile. Grab handles are typically attached directly to the roof side rail, while the curtain side air bags are also attached to the roof side rail at a location near to the grab handle attachment, through respective brackets, as is reflected in FIG. 1 of the drawings. Traditional known roof rail structure is formed from two stamped components that are welded together to form the roof side rail. The outer panel is designed to incorporate the grab handle support, while the inner panel is designed to mount the air bag bracket at the desired location, see FIGS. 1 and 2 of the drawings. The hydroformed roof side rail cannot directly provide the surfaces for mounting the grab handle and curtain air bag brackets because of the constraint of length of line in the formation of the hydroformed roof side rail member.

U.S. Pat. No. 6,364,343, granted to Gary Slota, et al on Apr. 2, 2002, discloses a bracket that is connectable to a roof side rail to mount the side curtain air bag and the grab handle at the same location. The grab handle is simply screwed to the bracket through connectors. The side curtain air bag is supported by the bracket beneath the grab handle. Similarly, U.S. Pat. No. 6,736,421, issued to Thomas Blake, et al on May 18, 2004, and U.S. Pat. No. 7,100,939, issued to Thomas Blake, et al on Sep. 5, 2006, teach a bracket that is affixed to the roof side rail to be utilized in mounting a side curtain air bag and the grab handle at the same location. In the Blake patents, the grab handle is attached through mounting brackets mounted on the air curtain bracket.

A bracket attached to the stamped, conventional roof side rail for housing a side curtain air bag has one side of the grab handle connected to the remote end of the bracket in U.S. Patent Publication No. 2004/0256843, published on Dec. 23, 2004. In U.S. Patent Publication No. 2007/005220, published on Mar. 8, 2007, a module containing the side curtain air bag, the grab handle and cover plates is fastened to the roof side rail to provide a common mounting structure for both the side curtain air bag and the grab handle.

Accordingly, it would be desirable to provide a mounting bracket that can accommodate the structure shortcomings of a hydroformed roof side rail to supply the mounting surfaces that would correspond to the conventional mounting surfaces of traditional stamped and welded roof side rails for the mounting of the grab handle and the side curtain air bag at the conventional locations with the curtain air bag being offset from the mounts for the grab handle.

SUMMARY OF THE INVENTION

It is an object of this invention to overcome the aforementioned disadvantages of the known prior art by providing a mounting bracket connectable to a hydroformed roof side rail to support brackets for a side curtain air bag and a grab handle.

It is another object of this invention to provide a mounting bracket that is operable to emulate the structure of a conventional stamped and welded roof side rail for the mounting of brackets for a side curtain air bag and a grab handle.

It is a feature of this invention that the connecting brackets for both the grab handle and the curtain air bag attachment are mounted to the mounting bracket that is attached to the hydroformed roof side rail frame member.

It is an advantage of this invention that the positioning of the connecting brackets for the grab handle and the air bag attachment do not change.

It is another advantage of this invention that the mounting bracket emulates the structure of a traditional stamped and welded roof side rail frame member while being affixed to a hydroformed frame member having a significantly different shape.

It is another feature of this invention that the mounting bracket has a three position attachment to the hydroformed roof side rail to provide a solid connection therebetween.

It is still another feature of this invention that the mounting bracket is formed with two mounting surfaces for supporting, respectively, the grab handle mounting bracket and the side curtain air bag mounting bracket.

It is yet another feature of this invention that the mounting bracket incorporates a bead at the bend between the two mounting surfaces to stiffen the bracket.

It is still another feature of this invention that the grab handle is mounted between a single function mounting bracket and a dual function mounting bracket.

It is a further feature of this invention that the dual function mounting bracket includes a pair of opposing side mounting tabs and a front mounting tab on the second mounting surface that can be welded to the surface of the hydroformed roof side rail frame member.

It is still another advantage of this invention that the first mounting surface projects upwardly from the second mounting surface to provide support for the grab handle mounting bracket.

It is a further object of this invention to provide a dual function mounting bracket that will provide support for a connecting bracket for a grab handle and a connecting bracket for a side curtain air bag, which is durable in construction, inexpensive of manufacture, carefree of maintenance, facile in assemblage, and simple and effective in use.

These and other objects, features and advantages are accomplished according to the instant invention by providing a dual function mounting bracket that can be affixed to a hydroformed roof side rail to allow the connecting brackets to be located at the same position as previously known despite the use of a hydroformed roof side rail that has a substantially different shape and configuration. The dual function mounting bracket has a first mounting surface projecting upwardly from a second mounting surface to provide support for a grab handle connecting bracket. The second mounting surface provides support for the connecting bracket of a side curtain air bag. The second mounting surface is also configured with a pair of side tabs and a front tab for welding the mounting bracket to a hydroformed roof side rail. The grab handle spans between the mounting bracket and a spaced apart sole function mounting bracket. A bead between the first and second mounting surfaces on the dual function mounting bracket provides stiffness.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
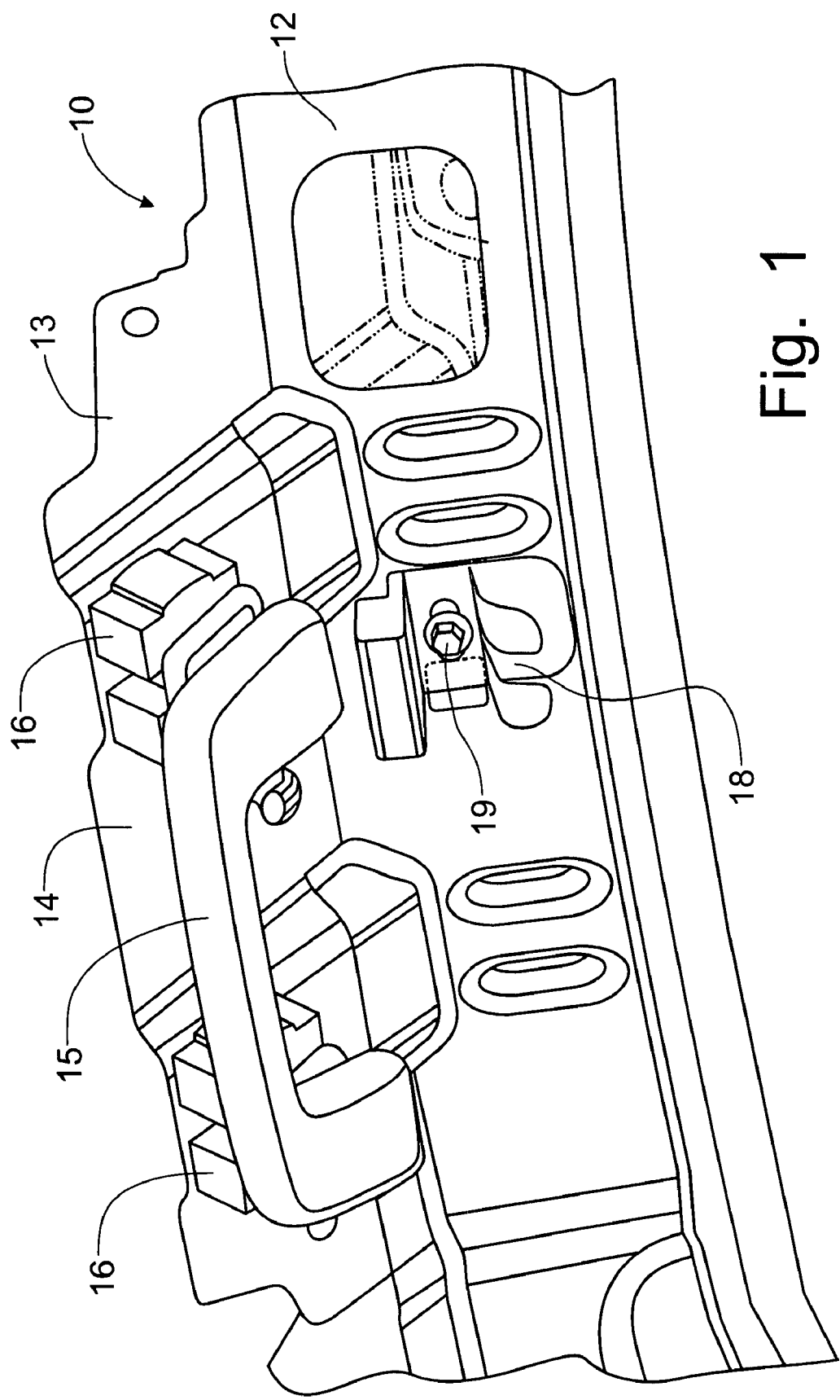
FIG. 1 is a partial perspective view of a prior art automotive roof side rail over which the instant invention is an improvement, showing the mounting of the grab handle and the side curtain air bag attachment.
Figure 2:
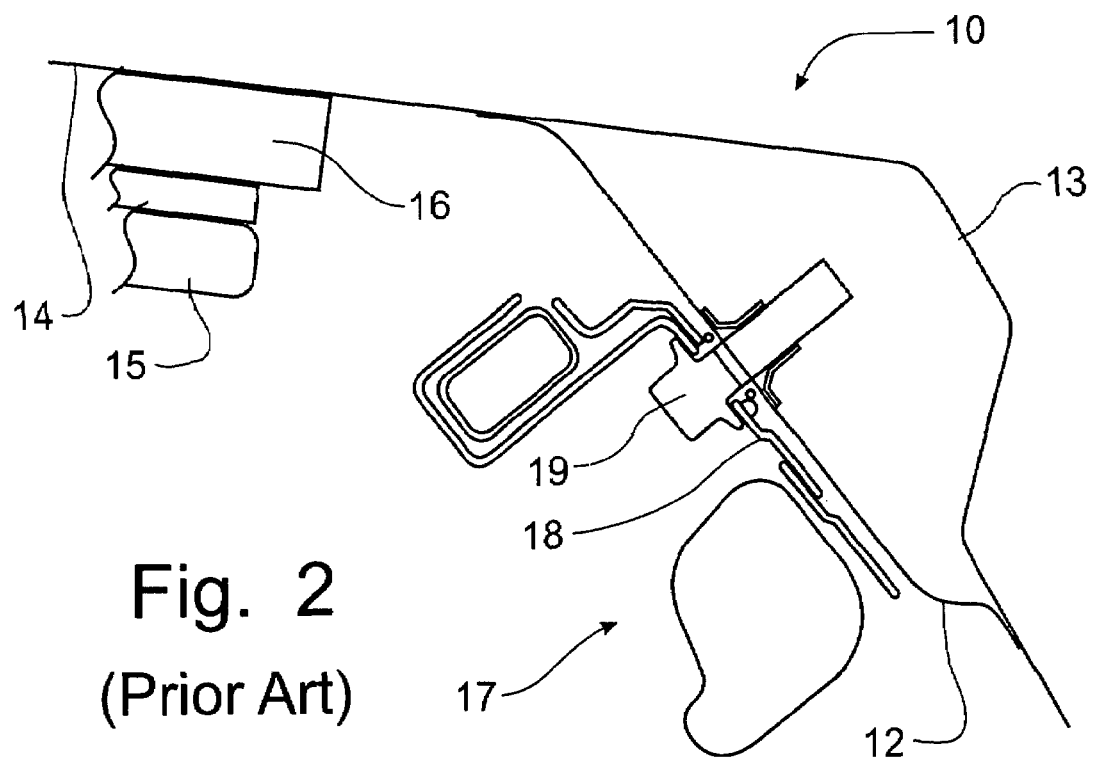
FIG. 2 is a schematic cross-sectional view of the prior art automotive roof side rail shown in FIG. 1.

Referring to FIGS. 1 and 2, the mounting of a conventional grab handle and side curtain air bag attachment to a traditional stamped and welded automotive roof side rail, as is known in the art, can best be seen. This traditional automotive roof side rail 10 is formed from stamped inner and outer members, 12, 13, respectively, that are welded together to form the roof side rail. The outer member 13 projects upwardly past the inner member to provide a mounting surface 14 for the attachment of the connecting bracket 16 for the grab handle 15 thereto. The connecting bracket 18 for the side curtain air bag attachment 17 is attached directly to the inner member 12. The fastener 19 attaching the air bag connecting bracket 18 projects into the interior cavity of the roof side rail 10.

Figure 3:
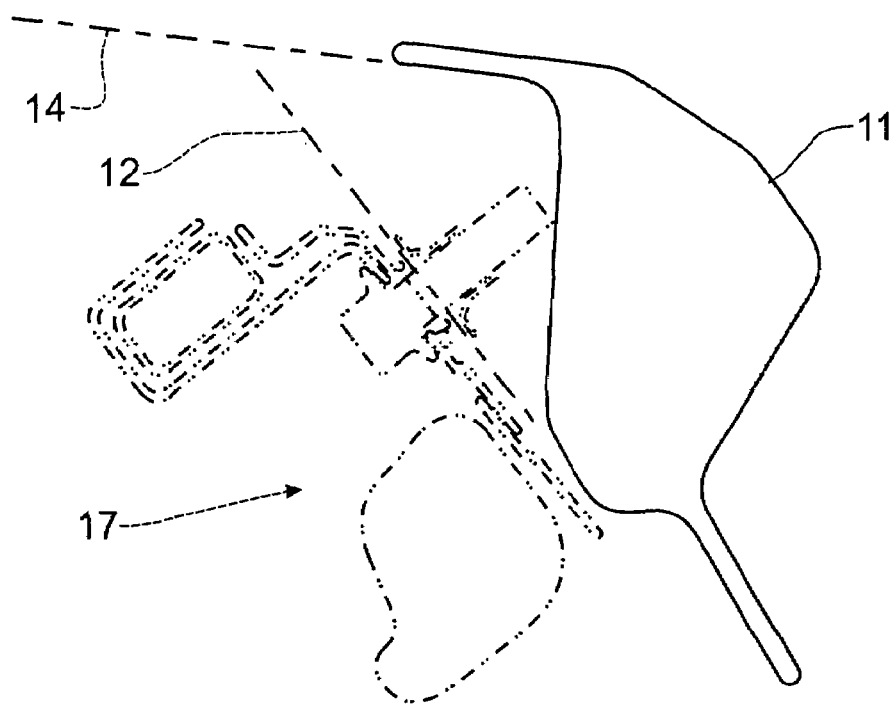
FIG. 3 is a schematic cross-sectional view, similar to that of FIG. 2, but depicting the hydroformed roof side rail, with the conventional side curtain air bag shown in phantom superimposed against the roof side rail.
Figure 4:
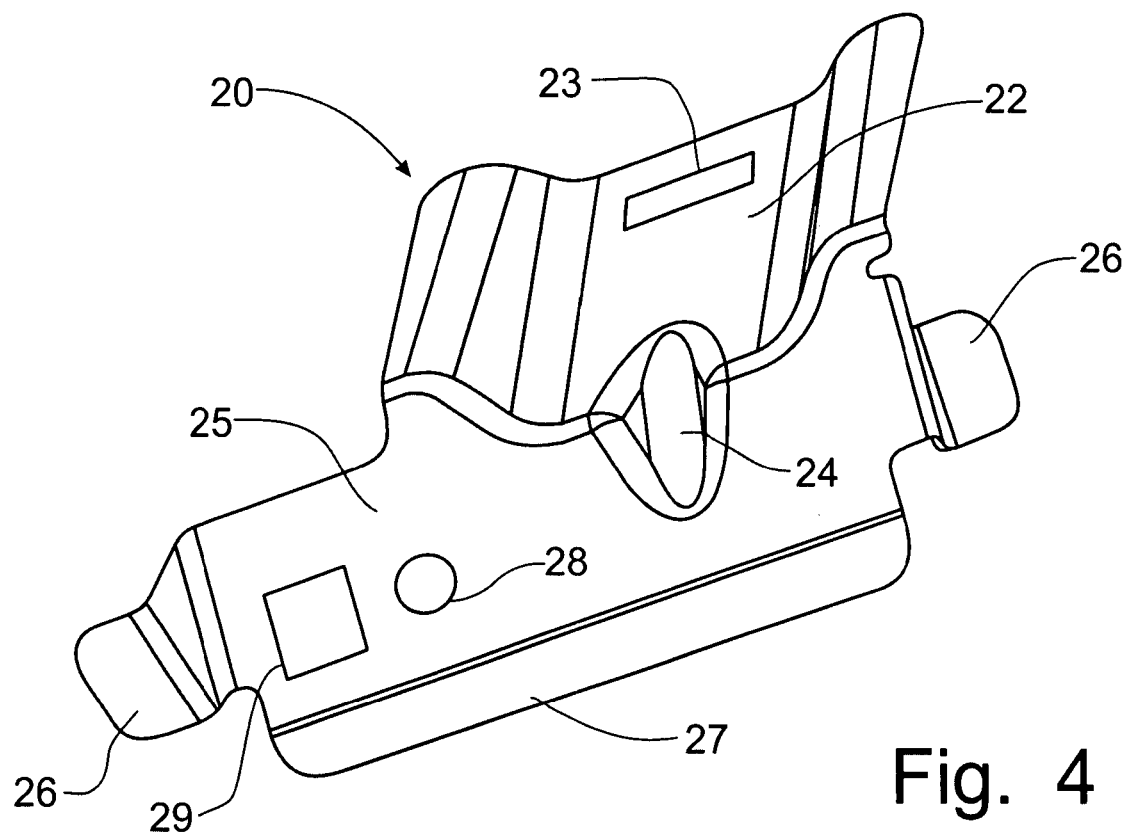
FIG. 4 is a perspective view of the dual function mounting bracket incorporating the principles of the instant invention.
Figure 5:
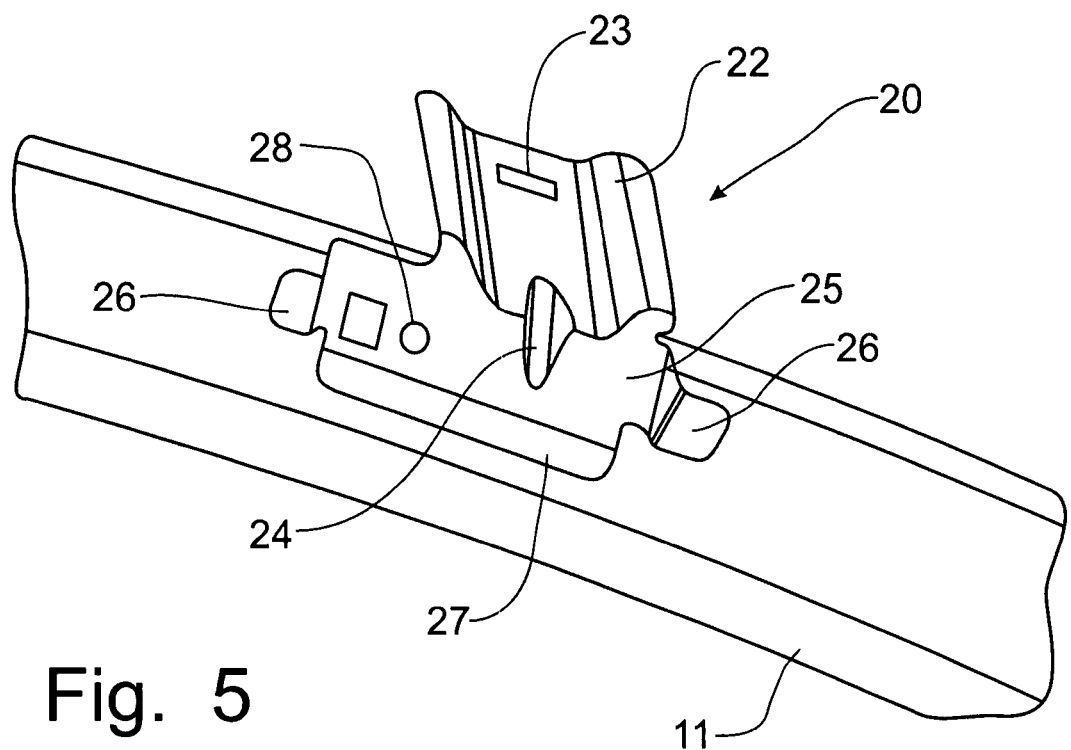
FIG. 5 is a perspective view of the dual function mounting bracket mounted on a hydroformed roof side rail.

The utilization of the hydroforming manufacturing process to form a shaped automotive roof side rail 11, as depicted in FIG. 3, is limited in the ability to change shapes to accommodate issues such as the mounting of the grab handle connecting bracket 16. As can be seen in FIG. 3, the hydroformed roof side rail 11 does not incorporate a mounting surface 14 on which the grab handle connecting bracket 16 can be mounted. The air bag connecting bracket 18 is not situated much better for connection to the hydroformed roof side rail 11, as the surface corresponding to the inner member 12 is also missing from the hydroformed roof side rail 11.

As is best seen in FIGS. 4-8, a dual function mounting bracket 20, incorporating the principles of the instant invention can best be seen. The mounting bracket 20 is formed with a first mounting surface 22, positioned to emulate the mounting surface 14 provided by the outer member 13 of the prior art roof side rail 10, and a second mounting surface 25 oriented to replace the surface provided by the inner member 12 of the prior art roof side rail 10 for the attachment of the air bag connecting bracket 18. The first mounting surface 22 is angled slightly (at an acute angle depending on the specific configuration of the hydroformed roof side rail 11) to the second mounting surface 25 and projects upwardly therefrom in a cantilevered manner. To increase the stiffness of the mounting bracket 20, a stiffening bead 24 is formed between the first and second mounting surfaces 22, 25. The first mounting surface is formed with an opening 23 for the attachment of the connecting bracket 16 for one end of the grab handle 15.

The second surface 25 is formed with attachment tabs 26 located at opposing ends of the second mounting surface 25 to contact the hydroformed roof side rail 11 and permit welding thereto. The second surface 25 is also formed with a linear attachment flange 27 extending along the lower edge of the second surface 25 to engage another surface of the hydroformed roof side rail 11 to permit welding thereto. The welding of the mounting bracket 20 by the two attachment tabs 26 and the attachment flange 27 provides a stable connection between the mounting bracket 20 and the hydroformed roof side rail 11. As can be seen best in FIGS. 4-6, the second mounting surface 25 has a transverse width dimension that is greater than the corresponding transverse width dimension of the first mounting surface, thus enabling the opening 28 through which the fastener 19 for the air bag connecting bracket 18 passes to be offset both transversely and longitudinally from the position of the opening 23 for the attachment of the grab handle connecting bracket 16. An access opening 29 is also provided adjacent to the attachment opening 28 to providing wiring to the side curtain air bag attachment 17, as is known in the art.

To complete the mounting of the grab handle 15 onto the hydroformed roof side rail 11 in the same location as is known for the prior art stamped and welded roof side rail 10, a sole function bracket 30 is mounted on the hydroformed roof side rail 11 adjacent to the dual function mounting bracket 20. The sole function mounting bracket 30 is formed with a first mounting surface 32 similar to that of the dual function mounting bracket 20 to position an attachment opening 33 for connection of the connecting bracket 16 corresponding to the other end of the grab handle 15. The sole function mounting bracket 30 is also formed with an welding flange 35, bent at a more severe angle than is found between the first and second mounting surfaces 22, 25 on the dual function mounting bracket 20, because of the intended welding to the same surface of the hydroformed roof side rail 11 as are the attachment tabs 26. To increase stiffness of the sole function mounting bracket 30, a stiffening bead 34 is formed between the first mounting surface 32 and the welding flange 35.

Figure 6:
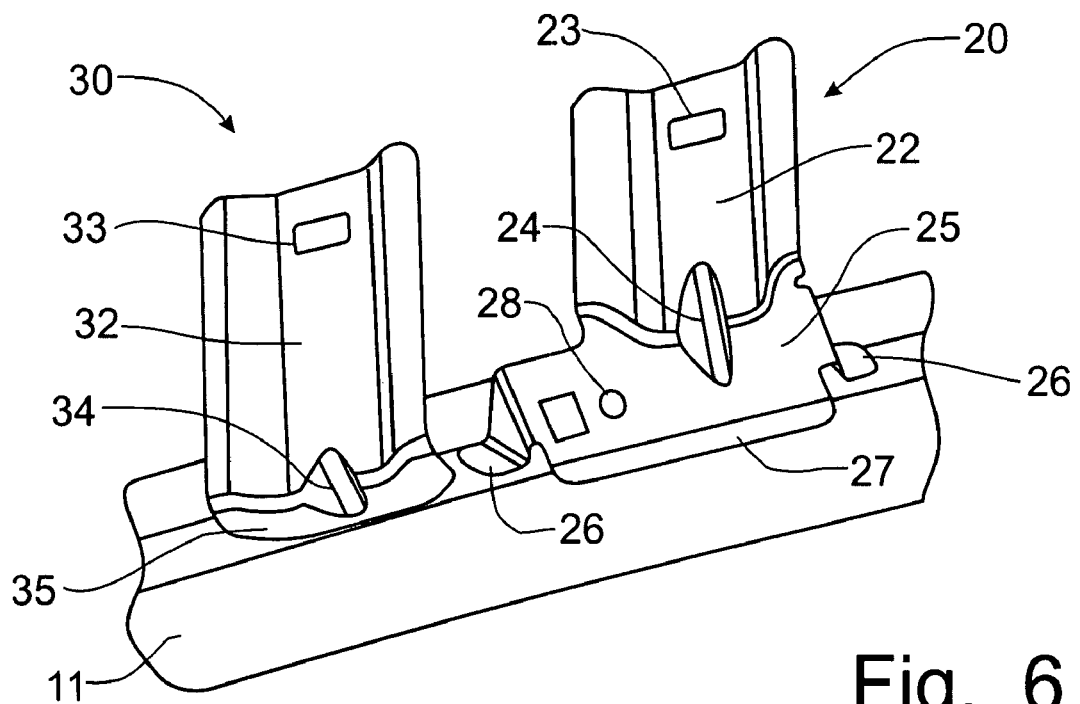
FIG. 6 is a perspective view of both the sole function mounting bracket and the dual function mounting bracket mounted on a hydroformed roof side rail.
Figure 7:
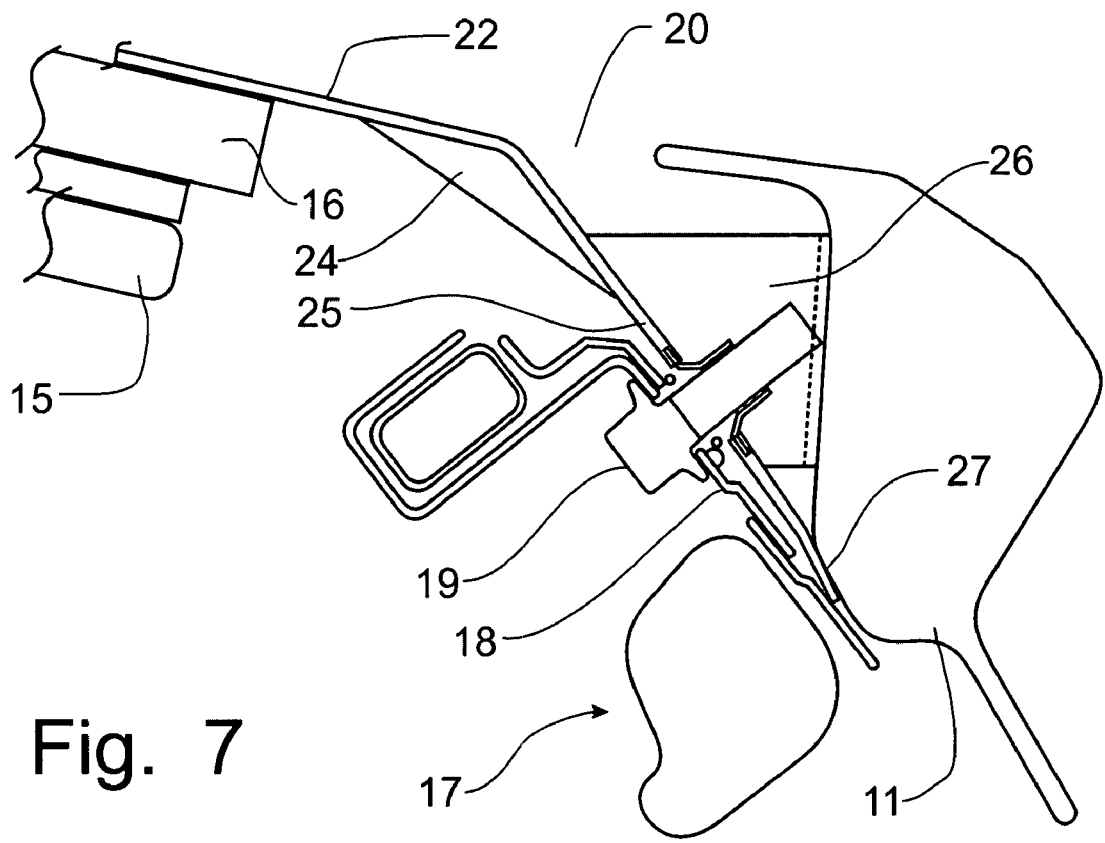
FIG. 7 is a schematic cross-sectional view of the mounting bracket incorporating the principles of the instant invention mounted on the hydroformed roof side rail, the air bag connecting bracket being mounted thereon.
Figure 8:
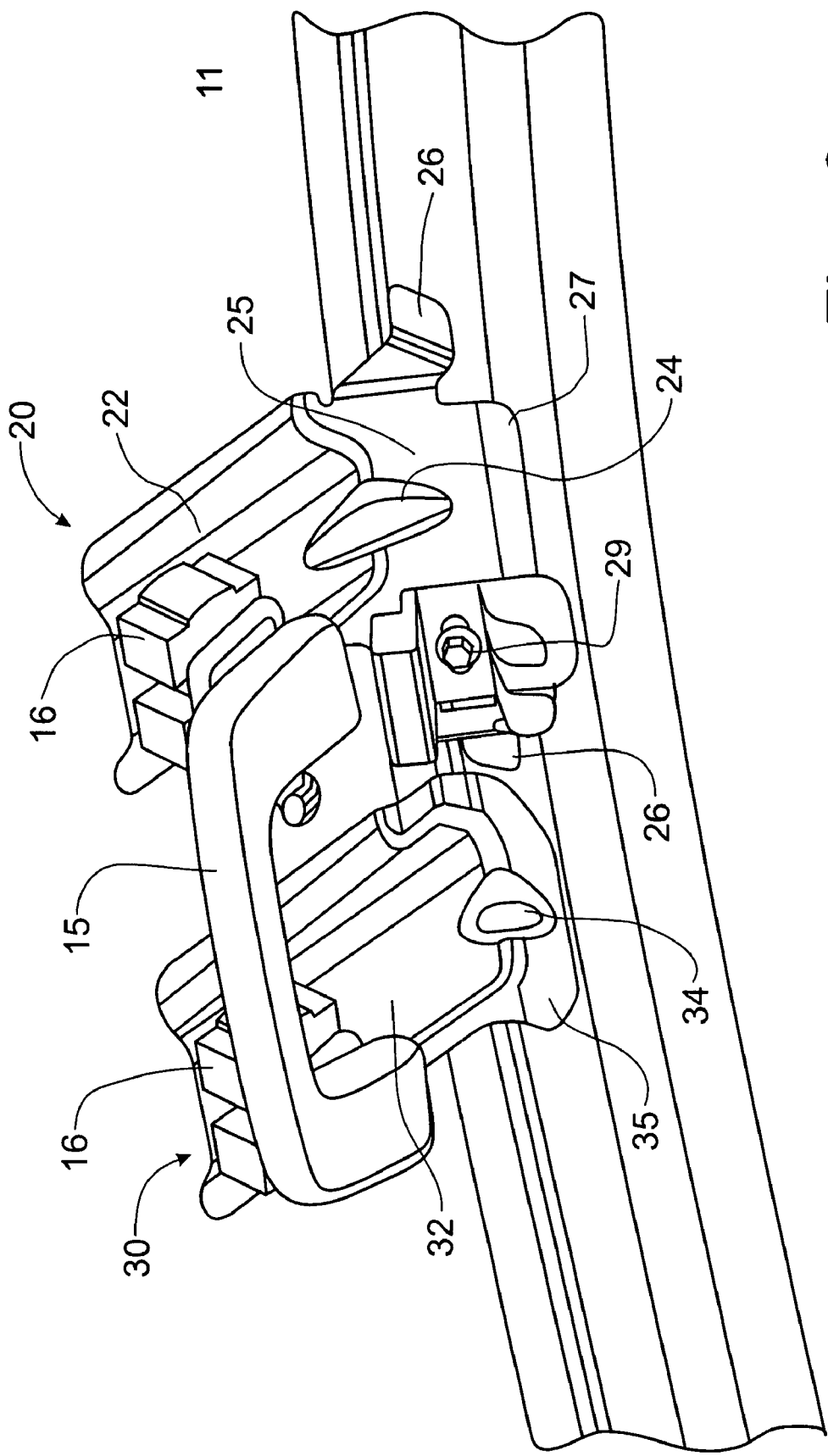
FIG. 8 is a perspective view similar to that of FIG. 1, but showing the mounting brackets supporting the connecting brackets for the grab handle and the side curtain air bag attachment according to the principles of the instant invention mounted on a hydroformed roof side rail.

As is best seen in FIGS. 6 and 8, the sole function mounting bracket 30 and the dual function mounting bracket 20 are welded to the hydroformed roof side rail 11 adjacent one another to provide support for the two connecting brackets 16 for the grab handle 15. The side curtain air bag attachment 17 is position below the grab handle 15 and offset from both grab handle connecting brackets 16, both of which are positioned the same as previously known in the art in conjunction with the traditional stamped and welded roof side rail 10.

In operation, the mounting brackets 20, 30 can be attached to the hydroformed roof side rail 11 after the roof side rail 11 has been formed by the hydroforming process. Appropriate access holes (not shown) can be formed in the hydroformed roof side rail 11 to facilitate the use of spot welding equipment to affect the welding of the attachment tabs 26 and the attachment flange 27 on the dual function mounting bracket 20 and the welding flange 35 on the sole function mounting bracket 30. Alternatively, MIG (metal inert gas) welding and other known methods of attaching the attachment tabs 26, 27 and the flange 35 to the roof side rail 11 could be utilized without requiring the provision of access holes. The grab handle 15 and the side curtain air bag attachment 17 can be connected to the mounting brackets 20, 30 through the conventional connecting brackets 16, 18 during a subsequent assembly process, which would not need to be modified since the location of the connecting brackets 16, 18, as well as the shape and configuration thereof, are not changed from those known in the art in use in conjunction with the traditional stamped and welded roof side rail 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A dual function bracket for connecting a grab handle and an air bag attachment to a roof side rail in an automotive vehicle, comprising:
   a first mounting surface having a first attachment opening formed therein to mount one end of said grab handle; and
   a second mounting surface oriented at an obtuse angle to said first mounting surface, said first mounting surface being integral with said second mounting surface and projecting upwardly therefrom, forming a bend line between said first and second mounting surfaces causing said second mounting surface to deflect through an acute angle from said first mounting surface, said second mounting surface having a second attachment opening formed therein to mount said air bag attachment thereto, Wherein said second attachment opening is offset transversely and longitudinally from said first attachment opening and wherein said second mounting surface is formed with a pair of attachment tabs located at opposing ends of the second mounting surface to permit a welding of the dual function bracket to a hydroformed roof side rail.

2. The bracket of claim 1 wherein said dual function bracket is formed with a stiffening bead located between said first and second mounting surfaces.

3. The bracket of claim 1 wherein said second mounting surface is also formed with an attachment flange extending along a lower edge of said second surface to permit welding thereof to said roof side rail.

4. The bracket of claim 3 wherein said attachment tabs are oriented at an angle to said second mounting surface.

5. The bracket of claim 1 wherein a sole function mounting bracket is affixed to said roof side rail adjacent to said dual function bracket to cooperate with said dual function mounting bracket for the connecting of the grab handle.

6. In an automotive vehicle having a generally longitudinally extending roof side rail formed as a tubular member, a grab handle and a side curtain air bag attachment, the improvement comprising:
   a dual function mounting bracket having first and second mounting surfaces oriented at an obtuse angle to one another, said second mounting surface having attachment members engagable with said roof side rail to position said second mounting surface away from said roof side rail, said first mounting surface projecting upwardly from said second mounting surface and having a first attachment opening for connecting a first end of said grab handle, said second mounting surface having a second attachment opening for connecting said side curtain air bag attachment; and
   a sole function mounting bracket mounted to said roof side rail adjacent said dual function mounting bracket and including a first mounting surface corresponding to said first mounting surface of said dual function mounting bracket, said first mounting surface of said sole function mounting bracket having a third attachment opening for connecting a second end of said grab handle.

7. The automotive vehicle of claim 6 wherein said second attachment opening is offset transversely and longitudinally from both said first and third attachment openings.

8. The automotive vehicle of claim 7 wherein said dual function bracket is formed with a stiffening bead located between said first and second mounting surfaces, said sole function mounting bracket having a stiffening bead formed between the first mounting surface thereof and an integral welding flange.

9. The automotive vehicle of claim 8 wherein said attachment members of said dual function mounting bracket include a pair of attachment tabs located on opposing transverse ends of said second mounting surface, and an attachment flange along a lower edge of said second mounting surface, said attachment tabs and said attachment flange being welded to said tubular roof side rail.

10. The automotive vehicle of claim 9 wherein said first mounting surface of said dual function mounting bracket projects in a cantilevered manner from said second mounting surface, said first mounting surface of said sole function mounting bracket extending upwardly in a cantilevered manner from said welding flange.

11. The automotive vehicle of claim 9 wherein said attachment tabs are oriented at an angle to said second mounting surface to locate said second mounting surface at an angle to said tubular roof side rail.

12. An apparatus for mounting a grab handle and an air bag attachment to a tubular roof side rail frame member, comprising:

a dual function mounting bracket having first and second mounting surfaces oriented at an obtuse angle to one another, said second mounting surface having attachment members engagable with said roof side rail to position said second mounting surface away from said roof side rail, said first mounting surface projecting upwardly from said second mounting surface and having a first attachment opening for connecting to said grab handle, said second mounting surface having a second attachment opening for connecting said side curtain air bag attachment; and a sole function mounting bracket mounted to said roof side rail adjacent said dual function mounting bracket and including a first mounting surface corresponding to said first mounting surface of said dual function mounting bracket, said first mounting surface of said sole function mounting bracket having a third attachment opening for connecting a second end of said grab handle.

13. The apparatus of claim 12 wherein said first and second mounting surfaces are integrally formed and define a bend line therebetween through which said second mounting surface deflects through an acute angle from said first mounting surface.

14. The apparatus of claim 13 wherein said second attachment opening is offset transversely and longitudinally from said first attachment opening.

15. The apparatus of claim 13 wherein said dual function bracket is formed with a stiffening bead located between said first and second mounting surfaces, said sole function mounting bracket having a stiffening bead formed between the first mounting surface thereof and an integral welding flange.

16. The apparatus of claim 12 wherein said attachment members of said dual function mounting bracket include a pair of attachment tabs located on opposing transverse ends of said second mounting surface, and an attachment flange along a lower edge of said second mounting surface, said attachment tabs and said attachment flange being welded to said tubular roof side rail.

17. The apparatus of claim 16 wherein said attachment tabs are oriented at an angle to said second mounting surface to locate said second mounting surface at an angle to said tubular roof side rail.

18. The apparatus of claim 12 wherein said first mounting surface of said dual function mounting bracket projects upwardly in a cantilevered manner from said second mounting surface, said first mounting surface of said sole function mounting bracket also extending upwardly in a cantilevered manner from said welding flange.

* * * * *